United States Patent [19]

House

[11] Patent Number: 4,902,190

[45] Date of Patent: Feb. 20, 1990

[54] FORK POSITIONING ATTACHMENT FOR LIFT TRUCKS

[75] Inventor: Marshall K. House, Portland, Oreg.

[73] Assignee: Cascade Corporation, Portland, Oreg.

[21] Appl. No.: 275,664

[22] Filed: Nov. 22, 1988

Related U.S. Application Data

[63] Continuation-in-part of Ser. No. 95,632, Sep. 14, 1987, abandoned.

[51] Int. Cl.⁴ .......... B60P 1/50

[52] U.S. Cl. .......... 414/667; 414/785; 414/607; 414/671

[58] Field of Search .......... 414/785, 607, 608, 664, 414/667, 668, 671, 589; 187/9 R, 9 E

[56] References Cited

U.S. PATENT DOCUMENTS 1,813,596 7/1931 Abbe .
2,339,120 1/1944 Ulinski .
2,451,943 10/1948 Gunning .
2,483,745 10/1949 Vossenberg .
2,748,966 6/1956 Gohrke .
3,424,328 1/1969 Gideonsen et al. .
4,280,781 7/1981 Bodin .
4,335,992 6/1982 Reaves .
4,381,166 4/1982 Smart .
4,688,982 8/1987 Smart .

FOREIGN PATENT DOCUMENTS 2853109 6/1980 Fed. Rep. of Germany .
53-61982 5/1978 Japan .
53-79673 7/1978 Japan .
54-120075 8/1979 Japan .
56-121095 9/1981 Japan .
56-140595 10/1981 Japan .
56-144098 10/1981 Japan .
59-172399 9/1984 Japan .
61-132397 8/1986 Japan .
2099787 12/1982 United Kingdom .

OTHER PUBLICATIONS

Advertisement dated Jul. 7, 1986 for Roto Tach Power Adjusting Systems, published by New Carlisle Tractor Inc.

*Primary Examiner*—Frank E. Werner
*Attorney, Agent, or Firm*—Chernoff, Vilhauer, McClung & Stenzel

[57] ABSTRACT

A fork positioner is mounted on a side-shifting carriage of a forklift truck and has transversely-movable, powered yoke assemblies for detachably engaging the upstanding portions of the forks and selectively moving them transversely toward and away from each other while they are supported by the upwardly-facing surface of the fork-supporting member of the side-shifting carriage. The fork positioner has a frame connected to the outwardly-facing, opposed transverse ends of the carriage fork-supporting member in rearwardly-overlapping relation thereto, so that neither the frame nor the fork-engagement structure of the fork positioner protrudes forwardly beyond the forward extremities of the upstanding portions of the forks, thereby minimizing the forward protrusion of the fork positioner beyond the front axle of a counterbalanced lift truck and thus maximizing its load-carrying capacity. The powered yoke assemblies include a pair of inverted U-shaped assemblies which fit over the tops of the upstanding portions of the forks, engaging the opposed transverse sides thereof in rearwardly-overlapping relation thereto. Despite such overhanging engagement of the forks by the U-shaped assemblies, the U-shaped assemblies engage the transverse sides of the upstanding portions of the forks at an elevation below the upwardly-facing fork-suppporting surface of the fork-supporting member of the side-shifting carriage.

6 Claims, 3 Drawing Sheets

FORK POSITIONING ATTACHMENT FOR LIFT TRUCKS

CROSS-REFERENCE TO RELATED APPLICATION

This application is a continuation-in-part of U.S. application Ser. No. 095,632, filed Sep. 14, 1987, now abandoned.

BACKGROUND OF THE INVENTION

This invention relates to fork positioners for adjusting the transverse spacing between load-lifting forks of a lift-truck, and to side-shifters for moving the forks transversely in unison. More particularly, the invention relates to a fork positioner for a lift truck side-shifting carriage which is compatible with standard forks and which does not require any structure protruding forwardly beyond the forward extremities of the upstanding portions of the forks, so as to maximize the counterbalanced load-lifting capacity of the lift truck.

Various types of fork positioners have been employed in the past to enable a lift truck operator to selectively adjust the transverse spacing between load-lifting forks for engaging different types of loads. Most of these have required the substitution of special load carriages with special forks for the standard carriage and forks of the lift truck, as exemplified by the following U.S. Pat. Nos.: 1,813,596; 2,451,943; 2,483,745; 2,748,966; 3,424,328; 4,335,992; and 4,381,166. Some, such as that shown in U.S. Pat. No. 4,280,781, also include a side-shifting function. However, the requirement for complete replacement of the standard carriage and forks of the lift truck makes such devices unduly expensive and time-consuming to install and remove.

On the other hand, some fork positioners are adapted to be mounted on a standard carriage compatibly with the standard forks, as shown in U.S. Pat. No. 4,688,982 and the following Japanese patent publication Nos.: 53-61982; 53-079673; 54-120075; 56-121095; 56-140595. However, these positioners do not provide side-shifting of the forks, which is a function needed much more frequently than is fork positioning to position the forks properly with respect to a load or with respect ot a load-depositing location. Also, these devices require fork-positioning structures which protrude either forwardly of the upstanding portions of the forks or behind the upstanding portions. This necessitates additional space in a fore-and-aft direction which forces the load to protrude forwardly of the front axle of the truck to an excessive degree, detracting from the load-lifting capacity of a counterbalanced lift truck.

Some fork positioners provide an intermediate fork-positioning carriage adaptable to mount on the standard carriage of the lift truck, as shown for example in U.S. Pat. No. 2,339,120 and the following West German patent publications: 2853109; 2929712; 3301595. Some of these carriages provide a side-shifting function in addition to fork positioning. However, these devices either require special forks which add to their expense, or likewise force the load to protrude forwardly of the front axle of the truck to an excessive degree.

Accordingly, what is needed is a fork positioner for a forklift truck which is compatible with the truck's standard forks and yet does not require excessive forward protrusion of the load to create space for the fork positioning mechanism.

SUMMARY OF THE INVENTION

The present invention satisfies this need by providing a fork positioner detachably engageable with standard forks and requiring no forward protrusion of the load greater than that which would be required if the fork positioner were not present. The fork positioner is able to engage the standard forks, without requiring additional forward protrusion, by the use of vertically inverted U-shaped fork-positioning assemblies which straddle the upstanding portions of the standard forks from above their tops, rather than from the front or rear, and thereby require only the same fore-and-aft space already required by the upstanding portions of the forks. The fork positioner is supported by means of a frame located outwardly of the opposite ends of the transverse fork-supporting member of the carriage, rather than against its front or rear face, thereby likewise requiring no additional forward protrusion.

Despite their top-engaging nature, the inverted U-shaped assemblies engage the transverse sides of the upstanding portions of the standard forks at an elevation below that of the fork-supporting surface of the carriage, which facilitates transverse sliding of the forks relative to the carriage without imposing forces which would tend to tilt the forks and cause binding as they attempt to slide transversely.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
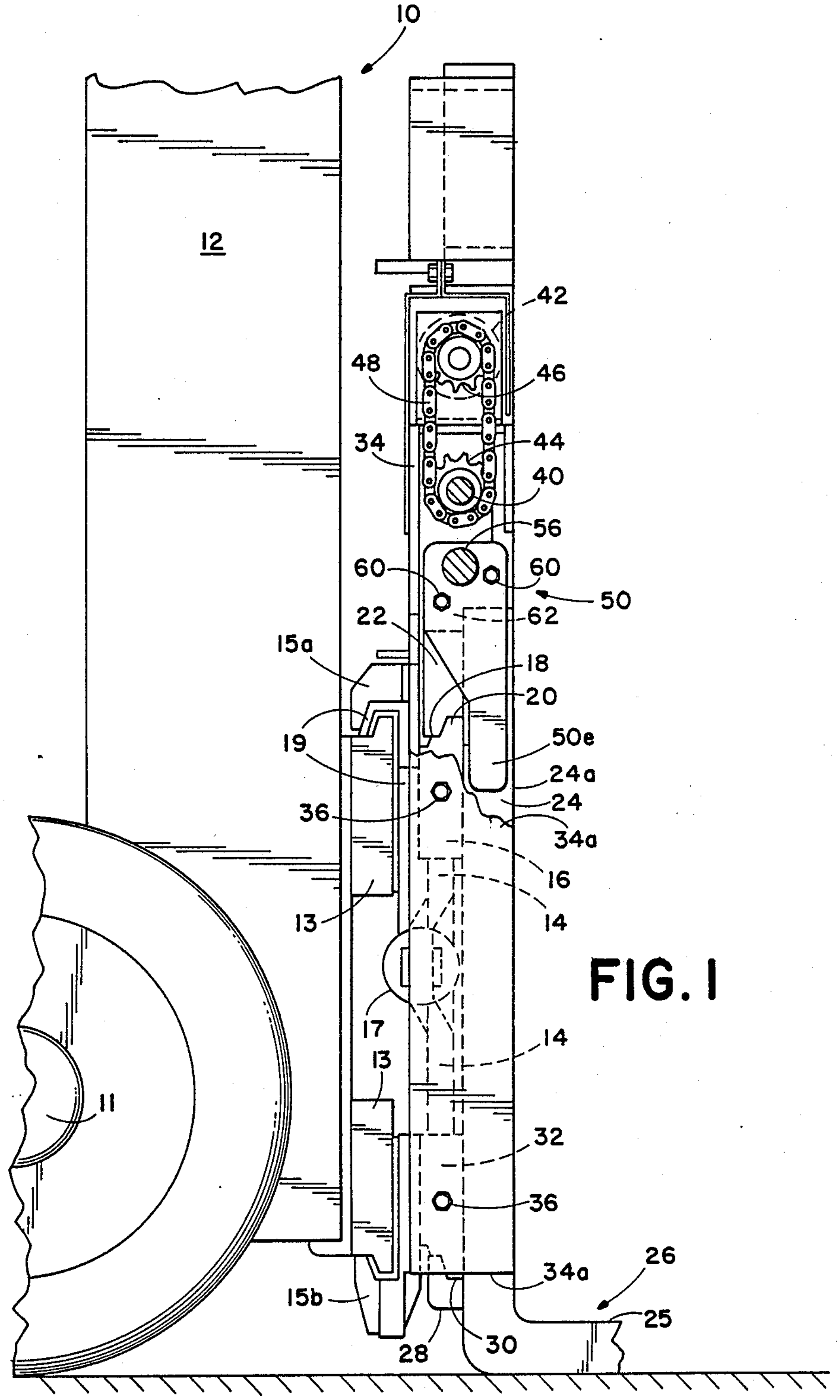
FIG. 1 is a partial side view of a lift truck having an exemplary fork positioner mounted on a side-shifting carriage in accordance with the present invention.

FIG. 1 shows the forward end of a typical counterbalanced lift truck 10 having a front axle 11 and mast 12 upon which is mounted a vertically-reciprocating standard load carriage 13 of a non-side-shifting type. A side-shifting carriage 14 is connected to the standard carriage 13 by upper and lower hooks 15*a* and 15*b*, respectively. These hooks are slidable transversely relative to the carriage 13 by actuation of a double-acting sideshift hydraulic cylinder 17 interposed between a hook-type bracket 19 affixed to the carriage 13 and the side-shifting carriage 14 in a manner similar to that shown in U.S. Pat. No. 4,406,575, which is incorporated herein by reference. The side-shifting carriage 14 includes an elongate, transversely-extending fork-supporting member 16 having an upwardly-facing fork-supporting surface 18 adjacent an upwardly-protruding lip 20. The surface 18 and lip 20 matingly engage downwardly-opening hooks such as 22 adjacent the tops of the upstanding portions 24 of a pair of standard load-supporting forks 26 having forwardly-protruding load-lifting portions 25. The hooks 22, which normally are connectable to the standard carriage 13 in the absence of the side-shifting carriage 14, are slidable transversely along the fork-supporting surface 18 of the fork-supporting member 16. The forks 26 are further connected to the carriage 14 by means of upwardly-opening hooks 28 at the bottom of the upstanding portions 24 of the forks which transversely slidably engage a downwardly-protruding lip 30 of a bottom fork-mounting member 32 on the carriage 14.

The fork positioner comprises a frame 34 which mounts to the side-shifting carriage 14 by means of side members 34*a* which abut the opposed transversely-facing ends of the fork-supporting members 16 and 32 in positions outwardly of the ends, fastening thereto by means of bolts 36 such that the frame 34 rearwardly overlaps the members 16 and 32, respectively. Also, as seen in FIG. 1, frame 34 and its side members 34*a* overlap the upstanding portions 24 of the forks 26 in a forward direction, but do not protrude forwardly beyond the forward extremities 24*a* of the upstanding portions 24 of the forks.

Figure 2:
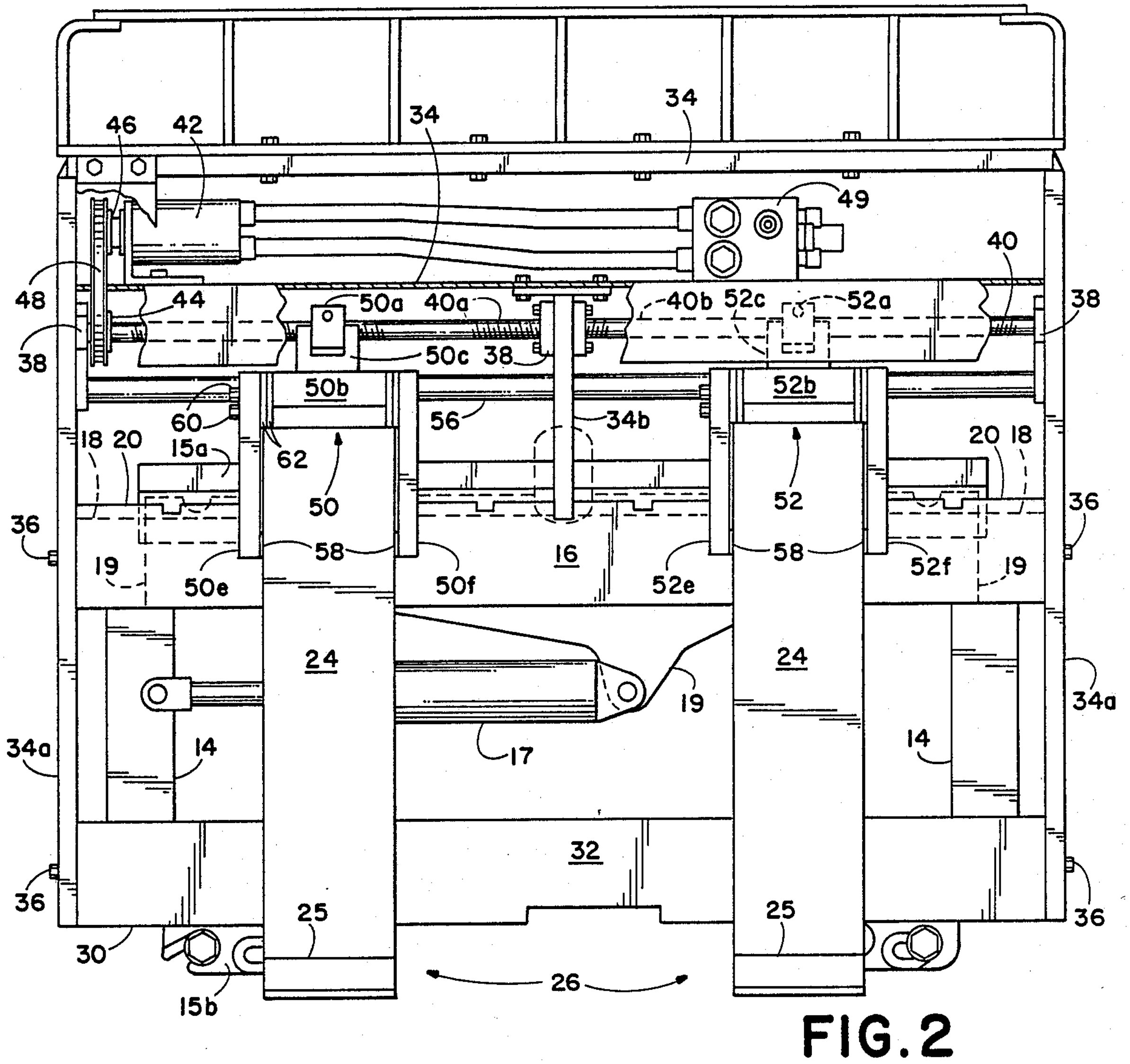
FIG. 2 is a front view of the fork positioner and side-shifting carriage of FIG. 1.

The side members 34*a* of the frame 34, as well as an intermediate frame member 34*b*, carry journal assemblies 38 (FIG. 2) which rotatably mount an elongate, transversely-extending screw member 40 with threads 40*a* formed on one-half of the screw member having a direction opposite to the threads 40*b* formed on the other half of the screw member. The screw member 40 is powdered by a reversible rotary motor 42 (FIG. 2), which may be either hydraulic (as shown) or electric, mounted on the frame 34 and driving a screw member sprocket 44 through a drive sprocket 46 and drive chain 48. Actuation and direction of rotation of motor 42 are controlled by the lift truck operator through a hydraulic valve 49 or electric switch communicating with the motor 42 by means of hydraulic or electrical conduits, as the case may be.

Figure 3:
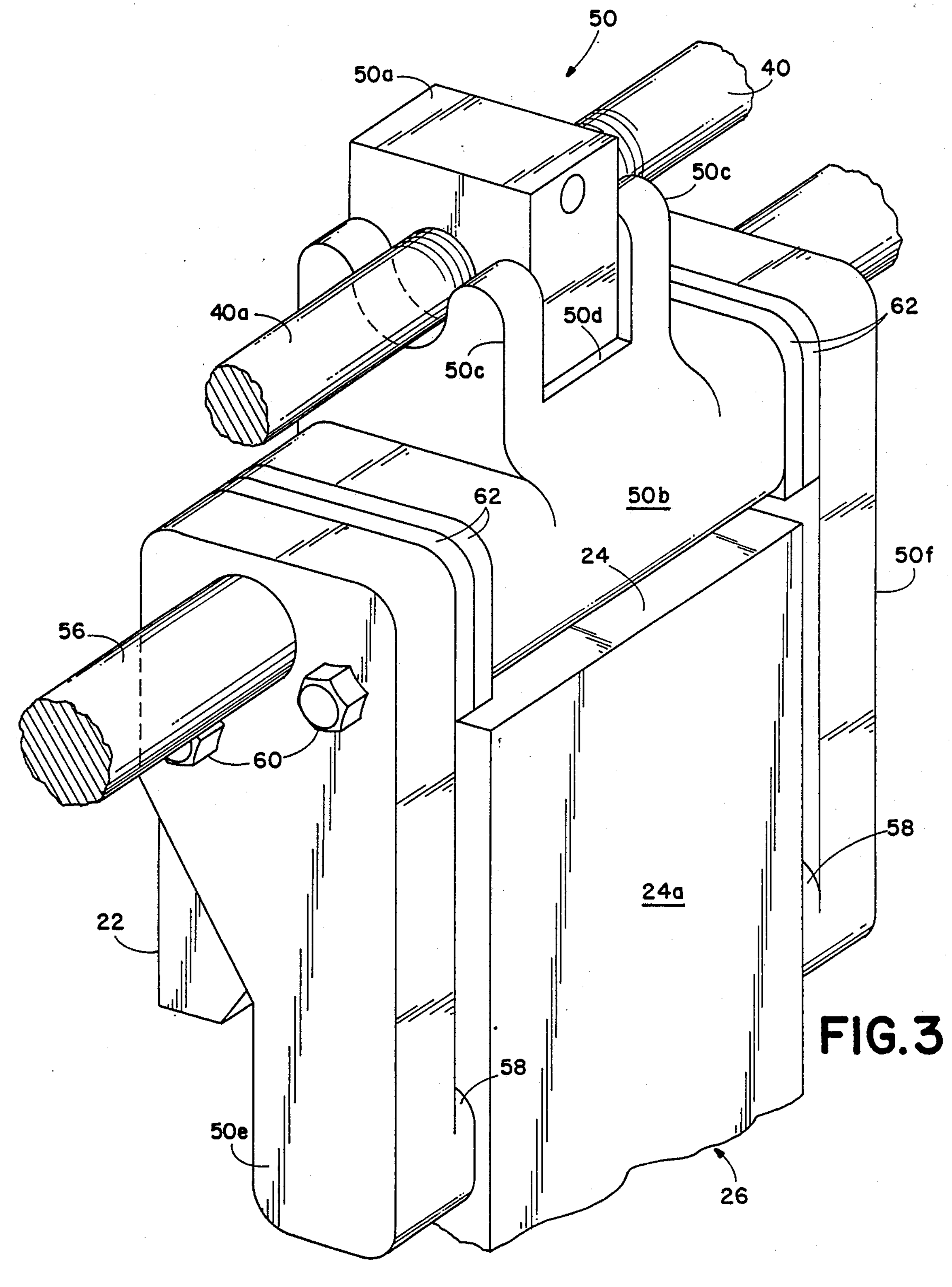
FIG. 3 is an enlarged partial front perspective view of a portion of the fork positioner of FIG. 1.

On each of the respective sets of threads 40*a* and 40*b* of the screw member, a respective inverted, U-shaped yoke assembly 50, 52 is threadably mounted so that the two yoke assemblies 50, 52 move transversely toward or away from each other simultaneously as the screw member 40 is rotated by the motor 42, depending upon the direction of rotation. Each yoke assembly 50 and 52 comprises a threaded nut 50*a*, 52*a*, and a respective base 50*b*, 52*b*, each base containing an aperture which slides transversely and supportably along a smooth rod 56 carried by the frame 34. Although the nuts 50*a*, 52*a* are loosely enclosed by the upwardly-opening fork-shaped members 50*c*, 52*c* on the top of each base 50*b*, 52*b*, the nuts are prevented from turning in unison with the screw member 40 by their contact with the surface, such as 50*d*, at the bottom of each fork-shaped member 50*c*, 52*c*. Depending from each base is a downwardly-protruding leg 50*e*, 50*f*, 52*e* and 52*f*, respectively. The pair of legs of each yoke assembly 50, 52 extend downwardly alongside the respective opposed transverse sides of the upstanding portion 24 of a respective fork in rearwardly-overlapping relationship thereto. As best seen in FIG. 3, the base portions of each yoke assembly extend over the top of each upstanding portion 24 of the forks, likewise in rearwardly-overlapping relationship thereto. Accordingly, not only does the frame 34 not protrude forwardly beyond the forward extremities 24*a* of the upstanding portions 24 of the forks, but the fork-positioning yoke assemblies likewise do not extend forwardly of the forward extremities 24*a*.

Despite their engaging positions over the tops of the upstanding portions 24 of the forks, the legs of the yoke assemblies 50, 52 extend downwardly sufficiently to engage the sides of the forks at locations below the fork-supporting surface 18 of the fork-supporting member 16. Inwardly-protruding caliper-type engagement shoulders 58 at the lower ends of the legs 50*e*, 50*f*, 52*e*, 52*f* prevent the application of transverse shifting force substantially above the surface 18. Each of these features helps to prevent the yoke assemblies from tilting the upstanding portions 24 of the forks sideways, which would cause binding of the hooks 22 relative to the surface 18 and thereby impede transverse sliding.

Adjustment of the transverse space between the legs 50*e* and 50*f*, and the legs 52*e* and 52*f*, to accommodate forks having different widths, is carried out by removing the bolts 60 which connect each leg to its respective base, inserting appropriate spacers 62 between the leg and the base, and refastening the bolts 60.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A fork-positioning attachment mounted upon a vertically-movable load-lifting carriage slidably mounted on the mast of a forklift truck having means for moving said carriage, said carriage being of the type having an elongate, transversely-extending fork-supporting member with an upwardly-facing, transversely-extending fork-supporting surface thereon for supporting a pair of load-lifting forks having upstanding portions engaged by said upwardly-facing fork-supporting surface, said forks having forwarldy-protruding load-lifting portions protruding from said upstanding portions, said attachment comprising:

(a) upstanding frame means mounted on said carriage in rearwardly-overlapping relation to said fork-supporting member for extending forwardly therefrom to substantially no greater an extent than the forward extremities of the upstanding portions of said forks while said upstanding portions are engaged by said fork-supporting surface; and (b) fork-positioning means mounted on said frame means for detachably engaging said upstanding portions of said forks to move them selectively toward and away from each other in a transverse direction while said upstanding portions are engaged by said fork-supporting surface, said frame means including means for mounting said fork-positioning means such that said fork-positioning means extend forwardly to substantially no greater an extent than said forward extremities of said upstanding portions of said forks while said upstanding portions are engaged by said fork-supporting surface;

(c) said fork-positioning means comprising a pair of inverted U-shaped means, each having a base from which a pair of transversely-spaced legs depend, for detachably engaging the respective tops of said upstanding portions of the respective forks such that the bases of the respective U-shaped means are positioned above the tops of said upstanding portions in rearwardly-overlapping relationship thereto and the legs of each of said respective U-shaped means depend downwardly along the transversely-opposed sides of a respective upstanding portion of a fork, also in rearwardly-overlapping relationship thereto.

2. The apparatus of claim 1 wherein said legs of said inverted U-shaped means include means for engaging said upstanding portions of said forks along the transversely-opposed sides thereof at an elevation below said fork-supporting surface of said fork-supporting member.

3. The apparatus of claim 2 wherein said legs further include means for substantially preventing said legs from engaging said upstanding portions of said forks along the transversely-opposed sides thereof at an elevation above said fork-supporting surface.

4. The apparatus of claim 1 wherein said load-lifting carriage is a side-shifting carriage, and wherein said forklift truck has a further carriage upon which said side-shifting carriage is slidably mounted so as to enable said side-shifting carriage and said fork-positioning attachment to move transversely relative to said further carriage, said side-shifting carriage including powered means interconnecting said side-shifting carriage and said further carriage for selectively causing said side-shifting carriage to move transversely relative to said further carriage.

5. A fork-positioning attachment mounted upon a vertically-movable load-lifting carriage slidably mounted on the mast of a forklift truck having means for moving said carriage, said carriage being of the type having an elongate, transversely-extending fork-supporting member with an upwardly-facing transversely-extending fork-supporting surface thereon for supporting a pair of load-lifting forks having upstanding portions engaged by said upwardly-facing fork-supporting surface, said forks having forwardly-protruding load-lifting portions protruding from said upstanding portions, said attachment comprising:

(a) upstanding frame means mounted on said carriage in rearwardly-overlapping relation to said fork-supporting member for extending forwarldy therefrom to substantially no greater an extent than the forward extremities of the upstanding portions of said forks while said upstanding portions are engaged by said fork-supporting surface;

(b) fork-positioning means mounted on said frame means for detachably engaging said upstanding portions of said forks to move them selectively toward and away from each other in a transverse direction while said upstanding portions are engaged by said fork-supporting surface, said frame means including means for mounting said fork-positioning means such that said fork-positioning means extend forwardly to substantially no greater an extent than said forward extremities of said upstanding portions of said forks while said upstanding portions are engaged by said fork-supporting surface; and (c) said transversely-extending fork-supporting member having a pair of transversely outwardly-facing opposite end surfaces and said frame means including a pair of members detachably abutting transversely against said outwardly-facing opposite end surfaces.

6. The apparatus of claim 5 wherein said load-lifting carriage is a side-shifting carriage, and wherein said forklift truck has a further carriage upon which said side-shifting carriage is slidably mounted so as to enable said side-shifting carriage and said fork-positioning attachment to move transversely relative to said further carriage, said side-shifting carriage including powered means interconnecting said side-shifting carriage and said further carriage for selectively causing said side-shifting carriage to move transversely relative to said further carriage.

* * * * *

UNITED STATES PATENT AND TRADEMARK OFFICE
CERTIFICATE OF CORRECTION

PATENT NO. : 4,902,190
DATED : February 20, 1990
INVENTOR(S) : Marshall K. House It is certified that error appears in the above-identified patent and that said Letters Patent is hereby corrected as shown below:

Col. 1, line 15 Delete hyphen (-) between "lift-truck"

Col. 1, line 45 Change "ot" to --to--

Col. 3, line 26 Change "powdered" to --powered--

Col. 4, line 35 Change "forwarldly" to --forwardly--

Col. 6, line 3 Change "forwarldly" to --forwardly--.

Signed and Sealed this

Third Day of December, 1991

*Attest:*

HARRY F. MANBECK, JR.

*Attesting Officer* *Commissioner of Patents and Trademarks*